Figure 1:
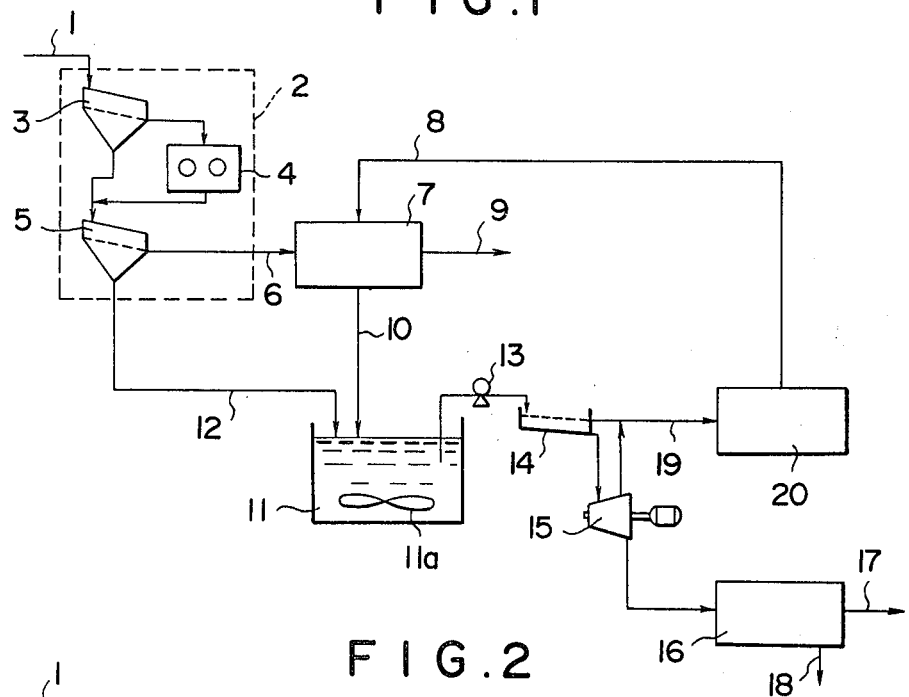

United States Patent [19]

Nakabayashi et al.

[11] 4,395,334
[45] Jul. 26, 1983

[54] TREATMENT OF WASTE WATER IN NON-EVAPORATING DEHYDRATION OF LOW GRADE COAL

[75] Inventors: Yasuyuki Nakabayashi, Yokohama; Yoshio Matsuura, Funabashi; Michio Kurihara, Mitaka; Takao Kamei, Ashiya; Akira Nakamura, Akashi; Keiichi Komai, Akashi; Akira Shimotamari, Akashi; Takeshi Wakabayashi, Kobe, all of Japan

[73] Assignees: Electric Power Development Co. Ltd.; Kawasaki Jukogyo Kabushiki Kaisha, both of Tokyo, Japan

[21] Appl. No.: 362,605

[22] Filed: Mar. 29, 1982

[30] Foreign Application Priority Data

Mar. 31, 1981 [JP] Japan .................................. 56-48951

[51] Int. Cl.³ .......................... B01D 15/00; F26B 7/00
[52] U.S. Cl. .................................. 210/631; 210/663; 210/694; 210/806; 210/180; 210/251; 210/295; 34/9; 34/12; 34/37; 44/1 G; 44/2
[58] Field of Search ............... 210/251, 631, 616, 663, 210/694, 295, 806, 180, 188; 34/9, 12, 14, 20, 35–37; 44/1 G, 2, 10 D; 209/10, 11

[56] References Cited

U.S. PATENT DOCUMENTS

| | | | |
|---|---|---|---|
| 3,300,403 | 1/1967 | Kehoe | 210/616 |
| 3,424,676 | 1/1969 | Johnson et al. | 210/694 |
| 3,892,661 | 7/1975 | Siviour et al. | 210/694 |
| 4,185,395 | 1/1980 | Nakako et al. | 34/12 |
| 4,254,560 | 3/1981 | Tanaka et al. | 34/12 |
| 4,294,584 | 10/1981 | Verschuur | 209/11 |
| 4,324,051 | 4/1982 | Sasaki et al. | 34/20 |

FOREIGN PATENT DOCUMENTS

53-112903  10/1978  Japan .................................. 44/1 G

Primary Examiner—Benoit Castel
Attorney, Agent, or Firm—Kerkam, Stowell, Kondracki & Clarke

[57] ABSTRACT

In a non-evaporating dehydration of brown coal, the coal is crushed and classified into lumps and fine particles. The lumps of coal are subjected to a non-evaporating dehydration in which waste water is produced. The waste water is contacted with the fine particles of coal so that components which affect the COD value of the water are absorbed by the coal particles. The coal particles are then burnt to produce saturated steam which is used in the non-evaporating dehydration.

10 Claims, 2 Drawing Figures

TREATMENT OF WASTE WATER IN NON-EVAPORATING DEHYDRATION OF LOW GRADE COAL

The present invention relates to a non-evaporation dehydrating process for dehydrating porous coals such as brown coals. More particularly, the present invention pertains to a treatment of waste water which is produced in the non-evaporation dehydrating process.

Brown coal is known as having a huge amount of deposits, however, it has not been widely utilized except in mine site since it contains a high amount of water and is of a strong activity. The brown coal produced in Australia, for example, contains more than 60% of water so that use of such coal leads us to poor transportation and thermal efficiencies. Therefore, it is necessary to have the coal dehydrated in the mining site so that its water content is decreased to less than 20%.

Hithertofore, dehydration of brown coal has been carried out by an evaporation process such as a dry air process or an indirect heating process. These processes, however, have disadvantages in that the heat consumption is excessive, that the material has to be crushed in advance and that the dust is produced upon dehydration. Further, fire is likely, to occur in the dehydrated coal.

In order to eliminate the above disadvantages, a saturated steam dehydration process has been developed. The process utilizes the liquid form dehydration phenomenon in which physical and chemical changes are produced in porous brown coal when it is heated under a non-evaporating atmosphere with the result that water in liquid form is removed from pores in the coal. In actual practice, the process is carried out by using a plurality of pressure vessels in which batch processes are proceeded with phase differences between the vessels. In one of typical processes, the brown coal to be dehydrated is sieved to remove fine powders and put into the vessels with time differences. Each of the vessels is then closed and supplied with saturated steam to be heated thereby so that water in the coal is removed in liquid form to produce hot water which is a mixture of the water removed from the coal and the condensed steam. The hot water is then introduced into a hot water reservoir. The vessel is thereafter depressurized so that the residual water in the brown coal is futher evaporated. The heat in the hot water may be recovered in a later stage of the process and the water is finally exhausted as a waste water.

The saturated steam dehydration process is believed as being of a high thermal efficiency because it has substantially no thermal loss due to heat absorption during evaporation. However, in this process, there is produced a lot of waste water as described above and the waste water contains about 10,000 ppm of solid suspension which is produced by fine particles of the brown coal. The waste water has approximately 10,000 ppm of chemical oxygen demand (COD) and approximately 7,000 ppm of biological oxygen demand (BOD), and shows a pH value of 3 to 5. The waste water cannot therefore be thrown away without being treated to remove the contaminants in the water.

Known methods generally adopted for treating a highly pollutant water include physical treatments such as sedimentation and filtration, chemical treatments such as precipitation and biological treatments which utilize biologically active mud. In case of the waste water as produced in the saturated steam dehydration process, solid particles in the form of suspension can be removed by means of a centrifugal separation, however, since the remaining water still shows high values of COD and BOD, it is necessary to apply a biological treatment to the water.

The precipitation treatment may be effective to remove substantially all of the solid suspension particles and decrease the COD and BOD values to less than 50% of the initial values, however, the treatment requires a lot of condensating agents which render the treatment expensive. Further, the treatment produces a huge amount of sludges so that additional costs are incurred for disposing such sludges.

The biological treatment using the active mud is effective to remove substantially all of the substances which cause an increase in the BOD value. Further, the treatment can decrease the COD value to substantially 50% of the initial value. However, the treatment is not recommendable because it requires a lot of additives, for example, nutritious agents for micro-organisms such as phosphoric acid and nitrogen, and polymeric condensating agents for treating surplus active mud. It is further advisable to dilute the waste water in order to decrease the load so that total amount of water is increased to such an extent that the investment for facilities to carry out such treatment must be significantly increased.

As a high grade treatment, an absorption treatment has also been known in the art. However, since the treatment utilizes expensive activated coal, it is suitable for removal of small amount of substances but it is not suitable for the treatment of a highly condensed waste water.

Thus, the waste water as produced in the saturated steam dehydration of the brown coal is large in amount and shows high values of solid suspension, COD and BOD although it does not contain poisonous substances such as heavy metal and cyanic material. Therefore, the known methods of treating the waste water and combination of such methods are very expensive particularly in the cost of agents which have to be added in the treatments so that the merits of the non-evaporating dehydration are lost and it becomes impossible to provide low cost energy sources.

It is therefore an object of the present invention to provide an economical method for treating waste water which is produced in the non-evaporating dehydration of porous coals.

Another object of the present invention is to provide an apparatus which is suitable for carrying out the method.

According to the present invention, the above and other objects can be accomplished by a method for dehydrating porous low grade coal comprising steps of classifying the coal into lumps and fine particles, subjecting the lumps of coal to a non-evaporating dehydration to produce dehydrated coal and waste water, bringing the waste water into contact with the fine particles of coal so that such components in the waste water that cause an increase in COD value of the waste water be absorbed by the coal particles, then subjecting the waste water into a solid-liquid separation to thereby remove fine particles of coal contained in the waste water, and burning the fine particles of coal to produce heat for carrying out the non-evaporating dehydration. The waste water may then be subjected to a biological treatment if necessary before it is thrown away.

The present invention is significant in that it effectively utilizes the fine particles of coal which are necessarily produced in the course of non-evaporating dehydration but cannot readily be dehydrated through the non-evaporating process. Thus, according to the present invention, such fine particles of coal are brought into contact with the waste water, before it is burnt, to thereby absorb the components in the waste water which cause an increase in the COD value.

It has been recognized that the non-evaporating or saturated steam dehydration is useful for dehydration of coal lumps but it cannot be readily applied to coal particles having a particle size less than 5 to 10 mm. If the lump size of coal is excessively large, the heating time will be increased and the processing efficiency will therefore be decreased. Therefore, the coal is usually crashed before it is subjected to the non-evaporating dehydration and fine particles are inevitably produced at this instance. Further, fine particles are also produced during mining and subsequent handling of coal. Such fine particles are separated from the lumps of coal. Conventionally, these fine particles may be dried by, for example, a conventional hot air drying process or may be burnt to produce high pressure steam which can be used in the non-evaporating dehydration. According to the process, however, such fine particles are at first brought into contact with the waste water for absorbing components therein to thereby decrease the COD value. The particles are then separated from the water by, for example, a simple physical method and transferred into a boiler to produce steam. The components absorbed in the coal particles do not produce any pollutant substances through the burning process so that the coal particles can be used without any problem as the heat source for the dehydration.

The water as separated from the coal particles is sufficiently clear so that it may be thrown away without applying any additional treatment such as precipitation or biological process. However, such additional treatment may be carried out as necessary. Even in such a case, it is possible to decrease the amount of adding agents since the load can be remarkably decreased by the absorption treatment in accordance with the present invention. Thus, the dehydration of coal can be carried out economically as compared with conventional processes.

The present invention further provides an apparatus for dehydrating porous low grade coal comprising classifying means for classifying the coal into lumps suitable for non-evaporating dehydration and fine particles which are not suuitable for non-evaporating dehydration, dehydrating means for subjecting the lumps of coal to a non-evaporating dehydration under hot water and steam to produce dehydrated coal and waste water, absorbing means for bringing the waster water into contact with the fine particles of coal so that components having influence on COD value of the waste water are absorbed by the fine particles of coal, separating means for receiving the waste water from the absorbing means and separating the fine particles from the water. The absorbing means may include agitating means which functions to bring the fine particle of coal into intimate contact with the waste water. Thus, the apparatus in accordance with the present invention includes, in addition to the conventional non-evaporating dehydration apparatus, the absorbing means and the separating means which can be built relatively inexpensively. Therefore, the process in accordance with the present invention can be carried out less expensively as compared with the conventional process in which expensive activated coal and/or a lot of treating agents have to be used for treating the waste water.

Figure 2:
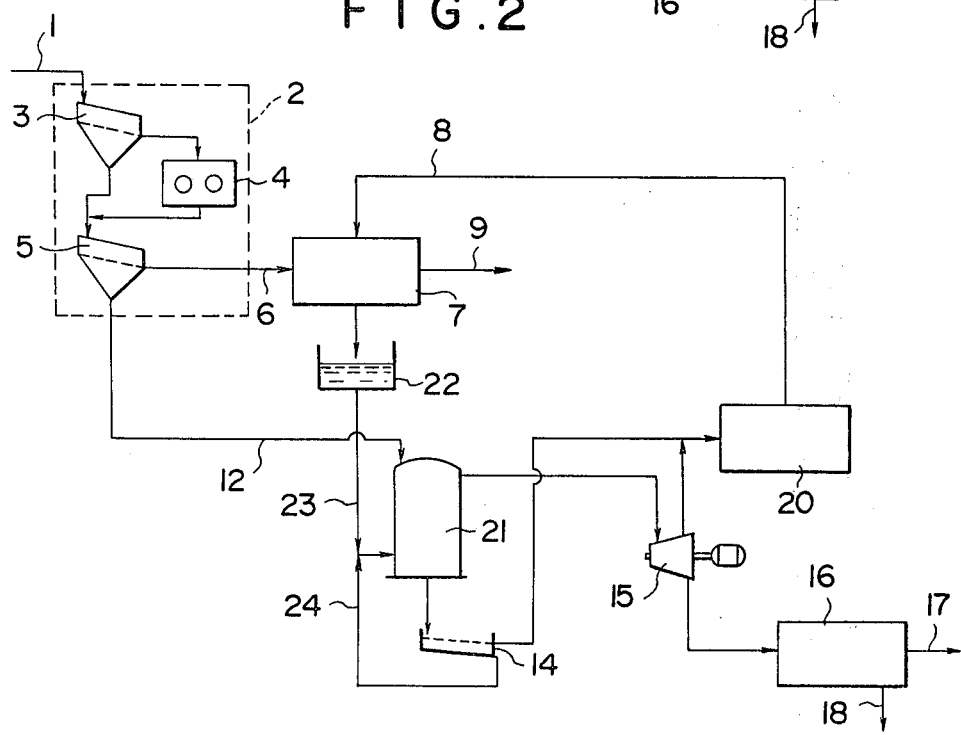

The above and other objects and features of the present invention will become apparent from the following descriptions of preferred embodiments taking reference to the accompanying drawings, in which:

FIG. 1 is a diagrammatical illustration of a non-evaporation dehydration system in accordance with one embodiment of the present invention; and, FIG. 2 shows another embodiment of the present invention.

Referring now to the drawings, particularly to FIG. 1, the dehydrating system shown therein includes a belt conveyor 1 for transferring brown coal to be dehydrated to a sieving device 2. The sieving device 2 includes a primary sieve 3, crasher 4 and a secondary sieve 5, and functions to separate fine particles which have particle size less than 5 mm and are not suitable for a non-evaporating dehydration from lumps of coal which have a particle size of 5 to 150 mm. The lumps of coal are transferred through a line 6 to a non-evaporating dehydration device 7 which is supplied through a line 8 with saturated steam or hot water of a temperature of 250° C. under a corresponding pressure. The lumps of coal are thus dehydrated in the dehydration device and, for example, the coal lumps having moisture content of approximately 65% is dehydrated to a moisture content of approximately 20%. The dehydrated coal lumps are taken out of the device 7 through a line 9.

As the result of the non-evaporating dehydration, there is produced waste water which is a mixture of water removed from the coal and condensate of the steam. More specifically, with regard to 1 kg of the coal lumps, approximately 0.56 kg of water is removed from the coal and 0.28 to 0.45 kg of condensate is produced. Thus, slightly less than 1 kg of waste water is produced for dehydrating 1 kg of the coal lumps. The waste water is directed through a line 10 to an absorbing vessel 11. Usually, the waste water contains approximately 10000 ppm of solid suspension and shows BOD value of approximately 700 ppm, and COD value of approximately 10,000 ppm, and pH value of 3 to 5.

The fine particles of coal as separated at the sieving device 2 is introduced through a line 12 to the absorbing vessel 11 so as to be mixed with the waste water in the vessel 11. The coal particles and the waste water are maintained in the vessel for approximately one hour so that the coal particles are intimately contacted with the waste water. In order that the intimate contact be ensured between the coal particles and the waste water, it is preferable to provide an agitating device 11a in the vessel 11. In this step, the components which affect the COD value of the waste water and other substances such as phenol are absorbed by the coal particles. The waste water containing the coal particles is then transferred by means of a sand pump 13 to a filter 14 which separates larger particles having particle size larger than the order of ten microns. The larger coal particles are transferred through a line 19 to a boiler 20. Smaller coal particles which have passed through the filter 14 together with the waste water are then transferred to a centrifugal separator 15 where the smaller coal particles are separated from the water and transferred through the line 19 to the boiler 20. The coal particles are burnt in the boiler to produce saturated steam which is supplied to the dehydrating device 7.

The waste water as taken out of the separator 15 may not meet anti-pollution requirements. Thus, the water may be transferred from the separator 15 to a biological treating device 16. Clean water is then exhausted through a line 17 and sludges are taken out through a line 18.

Referring now to FIG. 2 in which corresponding parts are shown by the same reference numerals as in the previous embodiment, it will be noted that a storage tank 21 is provided in the place of the absorbing vessel 11 to receive fine particles of coal from the secondary sieve 5 through the line 12. The waste water as produced in the dehydration device 7 is intermittently discharged to a surge tank 22 and then continuously introduced into the storage tank 21. In the storage tank 21, the coal particles move downwards whereas the waste water flows upwards so that the coal particles are contacted with the upflow of the waste water to thereby absorb the components which affect the COD value of the water and chemical substances such as phenol. The coal particles form a layer in the tank 21 which functions as a filter to remove a portion of suspension substances.

The water in the tank 21 is taken out at the top portion of the tank and transferred to the centrifugal separator 15 where fine particles of coal are separated from the water. The coal particles accumulated in the tank 21 are taken out from the bottom of the tank and separated from the water by the filter 14. The coal particles from the filter 14 and the separator 15 are carried to the boiler 20 to be burnt therein. The water separated from the coal particles at the filter 14 is returned through a line 24 to the storage tank 21.

The invention has thus been shown and described with reference to specific embodiments, however, it should be noted that the invention is in no way limited to the details of the illustrated arrangements but changes and modifications may be made without departing from the scope of the appended claims.

We claim:

1. A method for dehydrating porous low grade coal comprising the steps of: classifying the coal into lumps and fine particles, subjecting the lumps of coal to a non-evaporating dehydration under steam and hot water to produce dehydrated coal and waste water, bringing the waste water into contact with the fine particles of coal so that such components in the waste water that cause an increase in COD value of the waste water are absorbed by the coal particles, then subjecting the waste water to a solid-liquid separation to thereby remove fine particles of coal contained in the waste water, and burning the fine particles of coal to produce stream for carrying out the non-evaporating dehydration, and recycling said steam to the non-evaporating dehydration step.

2. A method in accordance with claim 1 which further includes a step of subjecting the waste water after the solid-liquid separation to a biological treatment to remove such components that affect BOD value of the water.

3. A method in accordance with claim 1 in which said waste water is contacted with the fine particles of coal in vessel means while agitating the water.

4. A method in accordance with claim 3 in which said waste water is contacted with the fine particles of coal by maintaining them in the vessel means for a predetermined time.

5. A method in accordance with claim 1 in which said waste water is contacted with the fine particles of coal by producing a counterflow therebetween.

6. An apparatus for dehydrating porous low grade coal comprising classifying means for classifying the coal into lumps suitable for non-evaporating dehydration and fine particles which are not suitable for non-evaporating dehydration, dehydrating means for subjecting the lumps of coal to a non-evaporating dehydration under hot water and steam to produce dehydrated coal and waste water, absorbing means for bringing the waste water into contact with the fine particles of coal so that components having influence on COD value of the waste water are absorbed by the fine particles of coal, separating means for receiving the waste water from the absorbing means and separating the fine particles from the water, boiler means for receiving the separated fine particles and burning said fine particles to produce steam, and means for recycling said steam to the dehydrating means.

7. An apparatus in accordance with claim 6 in which said absorbing means includes vessel means having agitating means provided therein for agitating the waste water and the fine particles of coal.

8. An apparatus in accordance with claim 6 in which said absorbing means includes tank means in which a counterflow of said waste water and said fine particles of coal is produced.

9. An apparatus in accordance with claim 6 in which said separating means includes filter means and centrifugal separating means.

10. An apparatus in accordance with claim 6 in which further includes biological treating means for receiving the water from said separating means and applying thereto a biological treatment.

* * * * *